(12) United States Patent
Goodson et al.

(10) Patent No.: US 6,975,676 B1
(45) Date of Patent: Dec. 13, 2005

(54) TIMING LOOP AND METHOD FILTER FOR A DIGITAL COMMUNICATIONS SYSTEM

(75) Inventors: Richard L. Goodson, Hunstville, AL (US); Steven R. Blackwell, Huntsville, AL (US); Ayman Ghobrial, Huntsville, AL (US); Cynthia Lin, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 572 days.

(21) Appl. No.: 09/670,047

(22) Filed: Sep. 25, 2000

Related U.S. Application Data

(60) Provisional application No. 60/156,037, filed on Sep. 24, 1999, provisional application No. 60/156,039, filed on Sep. 24, 1999.

(51) Int. Cl.[7] ............................................. H04B 1/10
(52) U.S. Cl. ...................... 375/231; 375/326; 375/350; 375/354
(58) Field of Search ..................... 375/375, 106, 375/108, 350, 354, 355, 229–233, 326–328; 341/155; 333/18, 28 R; 708/323

(56) References Cited

U.S. PATENT DOCUMENTS

| | | | | |
|---|---|---|---|---|
| 4,959,845 A | * | 9/1990 | Tol et al. | 375/354 |
| 5,097,488 A | * | 3/1992 | Kokubo et al. | 375/354 |
| 5,561,687 A | * | 10/1996 | Turner | 375/233 |
| 5,818,378 A | * | 10/1998 | Cheng et al. | 341/155 |
| 6,201,832 B1 | * | 3/2001 | Choi | 375/233 |
| 6,240,132 B1 | * | 5/2001 | Yedid | 375/232 |
| 6,526,105 B1 | * | 2/2003 | Harikumar et al. | 375/350 |
| 6,529,549 B1 | * | 3/2003 | Norrell et al. | 375/229 |
| 6,563,897 B1 | * | 5/2003 | Kitta | 375/375 |
| 6,775,334 B1 | * | 8/2004 | Liu et al. | 375/341 |
| 6,842,495 B1 | * | 1/2005 | Jaffe et al. | 375/326 |

* cited by examiner

*Primary Examiner*—Don N. Vo
(74) *Attorney, Agent, or Firm*—Waddey & Patterson; Mark J. Patterson

(57) ABSTRACT

A timing loop is used in a data communications receiver to time lock the receiver to a transmitter sending data across a communications loop, where the receiver includes a linear equalizer for correcting signal distortion associated with the communications loop. The timing loop includes a timing equalizer filter functionally positioned to provide an equalized signal to the phase detector portion of the timing loop. After the linear equalizer trains, the equalizer coefficients are copied to the timing equalizer.

12 Claims, 5 Drawing Sheets

TIMING LOOP AND METHOD FILTER FOR A DIGITAL COMMUNICATIONS SYSTEM

This application claims benefit of co-pending Provisional U.S. Patent Application Ser. No. 60/156,037 filed Sep. 24, 1999, entitled "Timing Device and Method Using A Timing Equalizer Filter for a Digital Communications System" and Provisional U.S. Patent Application Ser. No. 60/156,039 filed Sep. 24, 1999, entitled "Method and Apparatus for Duplex Transmission on a Four Wire Communication System."

Be it known that we, Richard L. Goodson, a citizen of United States, residing at 811 Jacqueline Drive, Huntsville, Ala. 35802; Steven R. Blackwell, a citizen of United States, residing at 1733 Blake Bottom Road, Huntsville, Ala. 35806; Ayman Ghobrial, a citizen of Egypt, residing at 204 E. Royal Pines Drive, Huntsville, Ala. 35806; and Cynthia Lin, a citizen of United States, residing at 119 Caenstone Court, Madison, Ala. 35758, have invented a new and useful "Timing Loop and Method for a Digital Communications System."

BACKGROUND OF THE INVENTION

This invention relates generally to data communications systems in which a transmitter sends a stream of user data across a communications loop to a receiver.

More particularly, this invention pertains to devices and methods for facilitating the process of acquiring and maintaining timing between data transmitters and receivers where an equalizer is used to adapt the receiver to overcome distortion in the user data signal caused by the communications loop.

In conventional digital communication systems, a stream of digital user data is sent from a transmitter to a receiver across one or more pairs of wires. In practice, a wire pair, sometimes referred to as a communications loop, can have different electrical characteristics that cause transmission delays, distortion of the transmitted data signal, and narrowing of the channel bandwidth. The data communications process in these systems requires that there be a timing synchronization between the transmitter and receiver. The problem of acquiring and maintaining this timing is a difficult one, particularly in systems where the edge of the received signal band is significantly attenuated or distorted due to the electrical characteristics of the loop.

Conventional digital communications receivers often use timing loop circuits of the type shown in FIG. 1 to recover timing from a received random digital signal. The timing loop shown in FIG. 1 is sometimes referred to as an "early-late" timing loop because it generates a phase error signal which is based on samples from the received signal that are taken slightly earlier and slightly later than the desired sample. The timing loop includes a data sampler having an input coupled to receive and sample the received digital signal and an output connected to a phase detector. The phase detector provides a phase error output signal corresponding to a difference between the mean squared values of the late samples and the early samples. The timing loop attempts to force the difference between the mean squared early samples and the mean squared late samples to be equal to zero, i.e., a zero phase error. To achieve this, the timing loop of FIG. 1 will generate a filtered error signal to adjust the frequency of a voltage controlled oscillator (VCO) until zero phase error is reached.

The rationale for using such an "early-late" timing loop is shown in the "eye" diagram of FIG. 2. Preferably, the timing loop will operate such that the "on-time" sample occurs at the widest opening of the eye diagram. In the example shown in FIG. 2, however, the on-time sample is too far to the left. It can be seen in this example that, on the average, the square of the early sample will be smaller than the square of the late sample. This will result in a negative phase error, which will reduce the VCO frequency and move the on-time sample to the right of the diagram.

A particular difficulty arises when the eye diagram like the one shown in FIG. 2 becomes distorted because of inter-symbol interference produced by the communications loop through which the signal must travel. When this occurs, there may not be a clear "eye" opening, and it becomes very difficult to distinguish between the early sample and the late sample.

Conventional communications receivers use linear equalizers to undo the effects of signal distortion caused by the communications loop. The linear equalizer must "train" initially to time synchronize with the incoming data stream. The training process results in setting the value of coefficients in the equalizer. In conventional receivers, both the equalizer and the timing loop can affect the transmitter/receiver timing relationship. During operation of the receiver, the timing loop is attempting to keep the data sampling time in the same relative position. The transmitter is sending data samples at a rate determined by its internal time base. The timing loop tries to adjust its time base so that it exactly matches the time base used in the transmitter. When the transmitter and receiver first start up, they are not time locked to each other. As the training process proceeds, eventually the transmitter and receiver become time locked where they are sampling at the same frequency.

As noted above, a conventional timing loop is trying to drive the receiver timing to a position where the timing error is zero. If the equalizer adjusts timing by, for example, one quarter of a sample then the timing loop will attempt to adjust to that change. If, as is done in conventional receivers, the timing error is taken at the output of the equalizer, an operational conflict is created between the timing loop and the equalizer. In some cases, such as when a communications system is operating continuously over an extended period of time, the equalizer will drift out of its operational range and cause a disruption in communications between the transmitter and receiver. In an attempt to overcome this problem, some in the prior art have taken the timing signal before the equalizer, using an unfiltered signal. This approach has not been effective in that there can be excessive noise in the timing loop due to distortion, resulting in performance loss.

What is needed, then, is a data communications receiver that includes an improved timing loop that acquires and maintains timing between data transmitters and receivers where an equalizer is used to adapt the receiver to overcome distortion in the user data signal caused by the communications loop.

SUMMARY OF THE INVENTION

The present invention is a timing loop and method used in a data communications receiver for acquiring and maintaining timing from a received data signal even when there is significant distortion in the signal due to the communications loop, such as attenuation at the signal band edge. The fundamental solution to the problem is to functionally position a timing equalizer filter in front of the timing loop, which separates the timing loop from operation of the linear equalizer and reduces the effect of the band-edge attenuation. By equalizing the received signal, the timing "eye" will open again, with less distortion, producing an "eye" diagram having the optimal characteristics shown in FIG. 2.

In one embodiment of the invention, coefficients from the linear equalizer, after the linear equalizer has been trained, are copied into the timing equalizer filter to set the filter coefficients. In another embodiment, the timing equalizer is provided with a fixed set of compromise filter coefficients.

DESCRIPTION OF THE PREFERRED EMBODIMENTS

Figure 1:
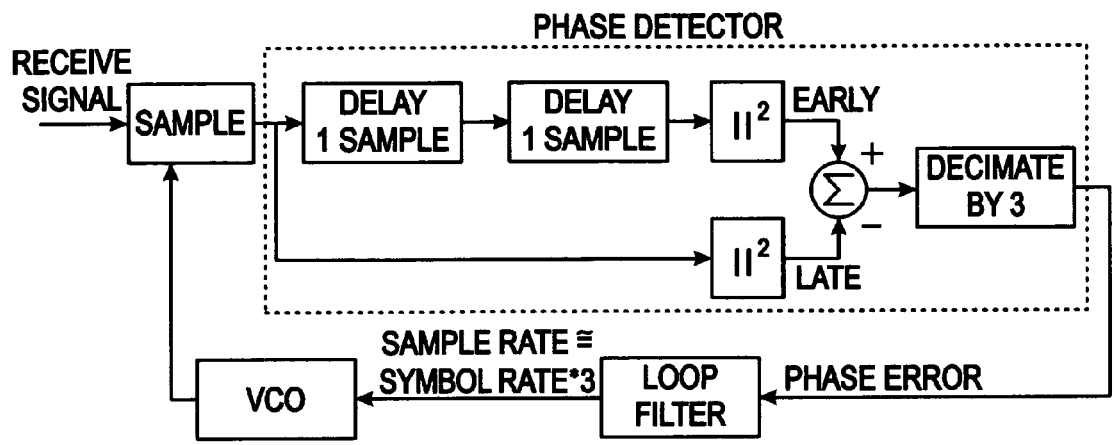
FIG. 1 is a block diagram of a prior art "early-late" timing control loop used in a digital communications receiver.
Figure 2:
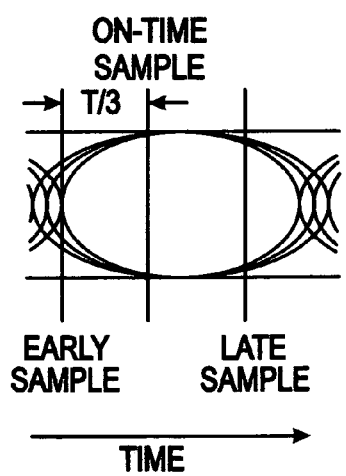
FIG. 2 is an "eye" diagram showing the preferred timing relationships between the early, on-time, and late received signal samples in an "early-late" timing loop used in a digital communications receiver.
Figure 3:
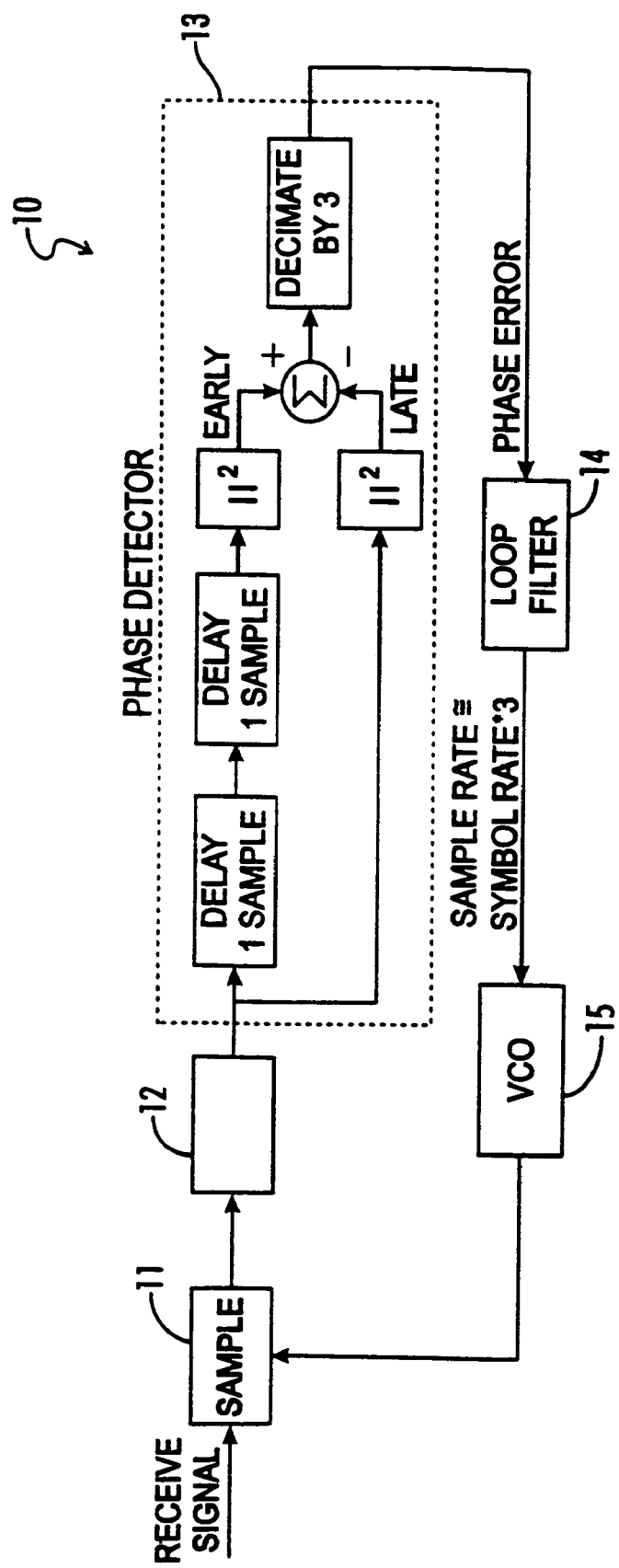
FIG. 3 is a block diagram of one embodiment of the timing loop of the present invention.

One embodiment of the improved timing loop and method of the present invention is shown in FIG. 3. The timing loop 10 includes a data sampler 11 having an input coupled to receive and sample a received data signal that has been sent by a transmitter (not shown) across a communications loop (not shown). The sampled signal from the sampler 11 is equalized in a timing equalizer filter 12 to remove distortion from the received signal. The equalized signal at the output of the timing equalizer filter 12 is processed by a conventional "early-late" phase detector 13 to determine the phase error in the signal and generate a phase error signal. The phase error signal is filtered in a loop filter 14 to provide a control voltage for a voltage controlled oscillator (VCO) 15. The output of the VCO 15 provides a timing signal. This timing signal is used by a remote data communications receiver, such as that shown in the upper portion of FIG. 5, to maintain a time lock with a transmitter located at a central location. (Although a central office transmitter is not shown, an embodiment of such a transmitter can correspond to the lower portion of the transceiver diagram of FIG. 5.)

The timing equalizer filter 12 can be implemented in hardware, software, or in any other manner known to those of ordinary skill in the art. In accordance with one aspect of the invention, the impulse response of the timing equalizer filter 12 can be derived from either of two sources: (1) the impulse response could be a compromise filter which would equalize a typical communications loop over which the transmitter and receiver will run, where the communications loop has predictable signal distortion characteristics; or (2) the impulse response could be taken from a linear equalizer (20 on FIG. 5) which would equalize the specific communications loop over which the system is currently running. In any event, the filter coefficients of the timing equalizer filter 12 should be chosen to equalize the received signals, so that signal output at the band edges is improved.

Figure 4:
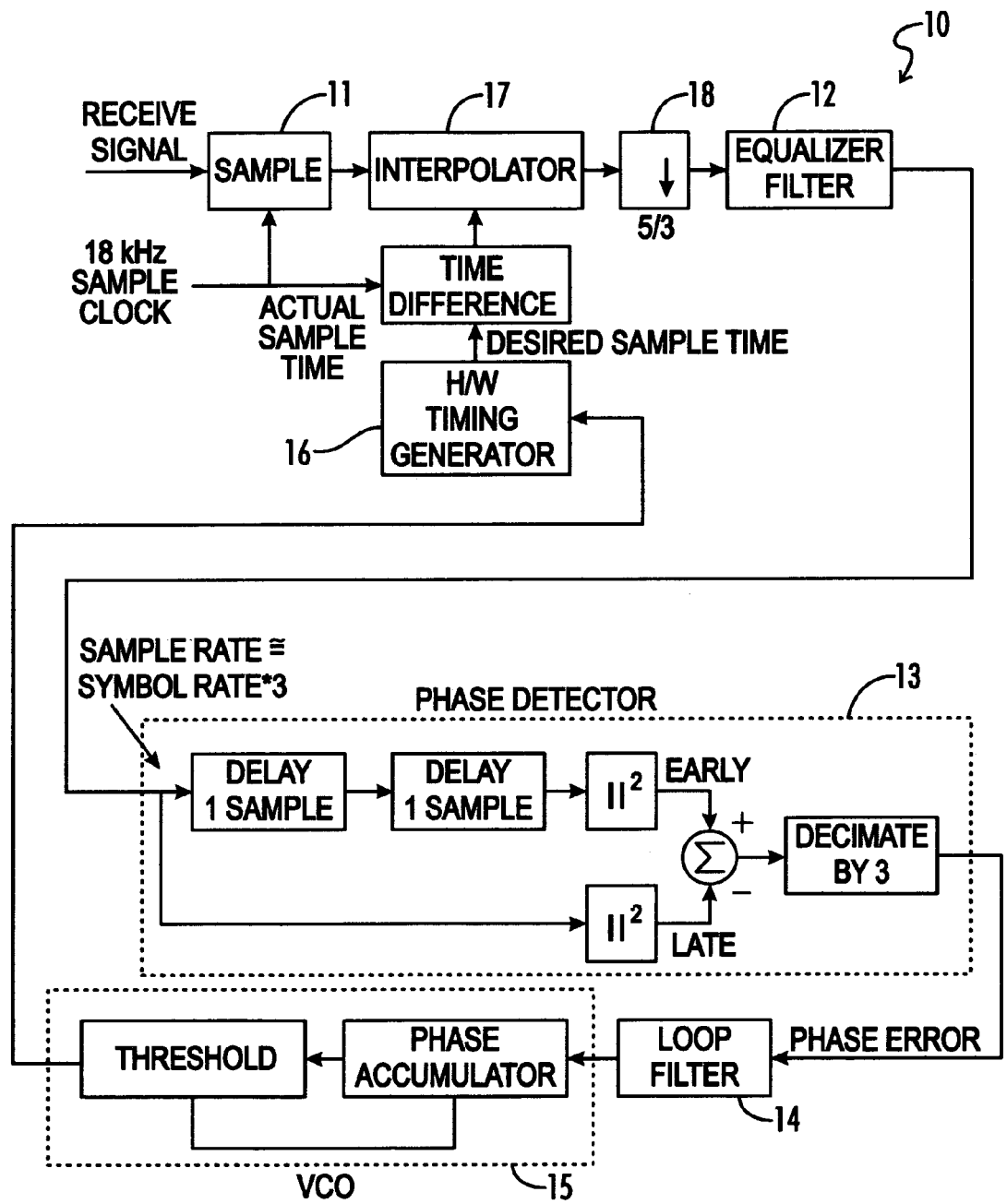
FIG. 4 is a detailed block diagram of an embodiment of the timing loop of the present invention.

In FIG. 4 a more detailed illustration of the timing loop 10 of FIG. 3 is shown. A conventional interpolator 17 and decimator 18 are positioned between the sampler 11 and timing equalization filter 12. The interpolator 17 changes the time base from the local 18 kHz timing to the central office timing. The decimator 18 reduces the sample rate to three times the symbol rate. Assuming that the timing loop 10 is associated with a receiver located at the remote end of a communications loop, the loop filter 14 and VCO 15 drive a hardware timing generator 16 to produce a timing signal which is phase and frequency locked to the transmitter at the central office end. This signal is then used to produce the bit and symbol clocks, and to determine the correct interpolator setting.

Figure 5:
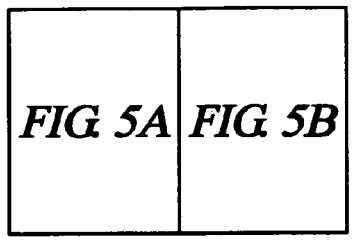
FIG. 5 is a block diagram of one embodiment of a digital communications transceiver that can be used in combination with the device and method of the present invention.
Figure 5A:
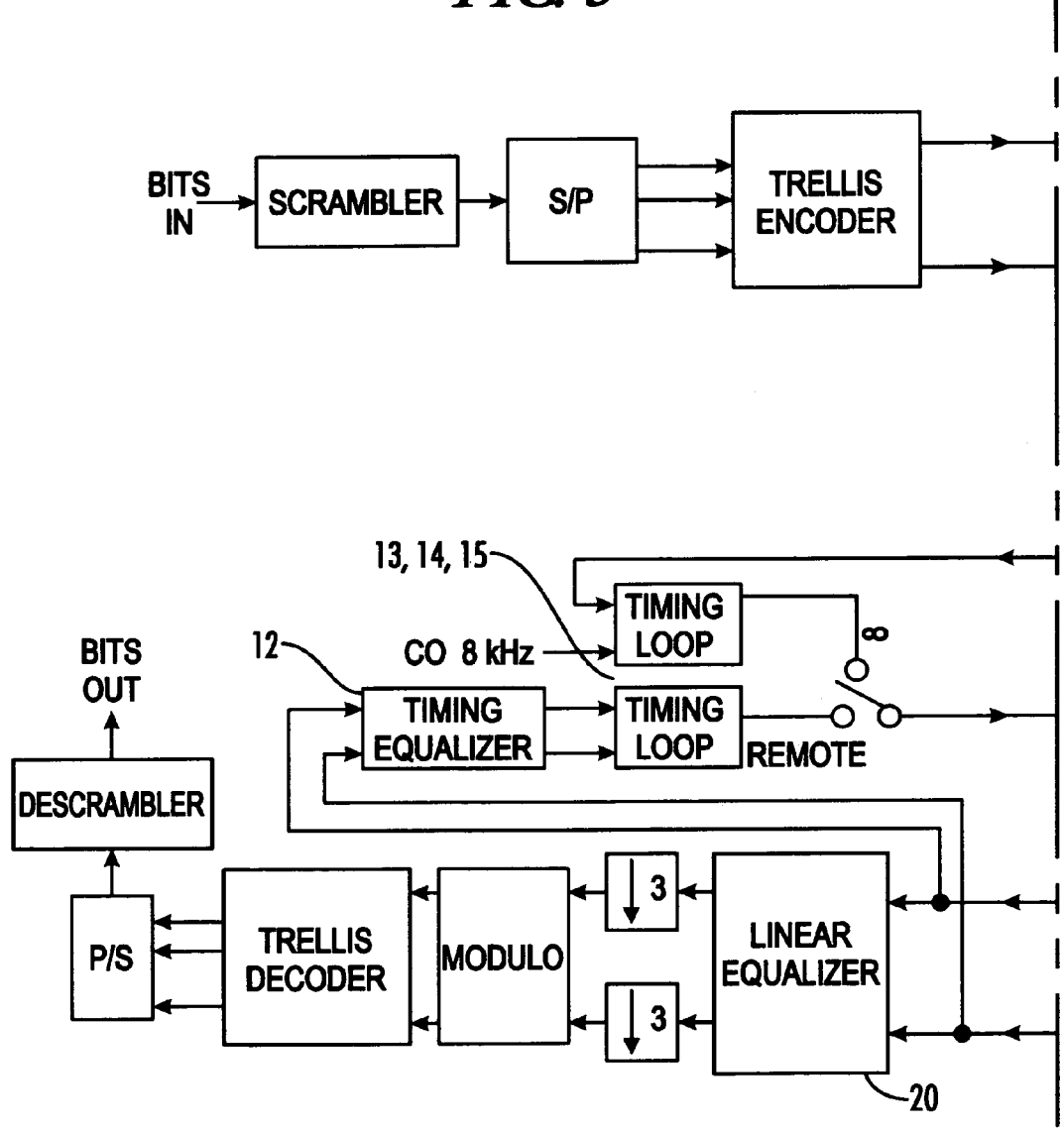
Figure 5B:
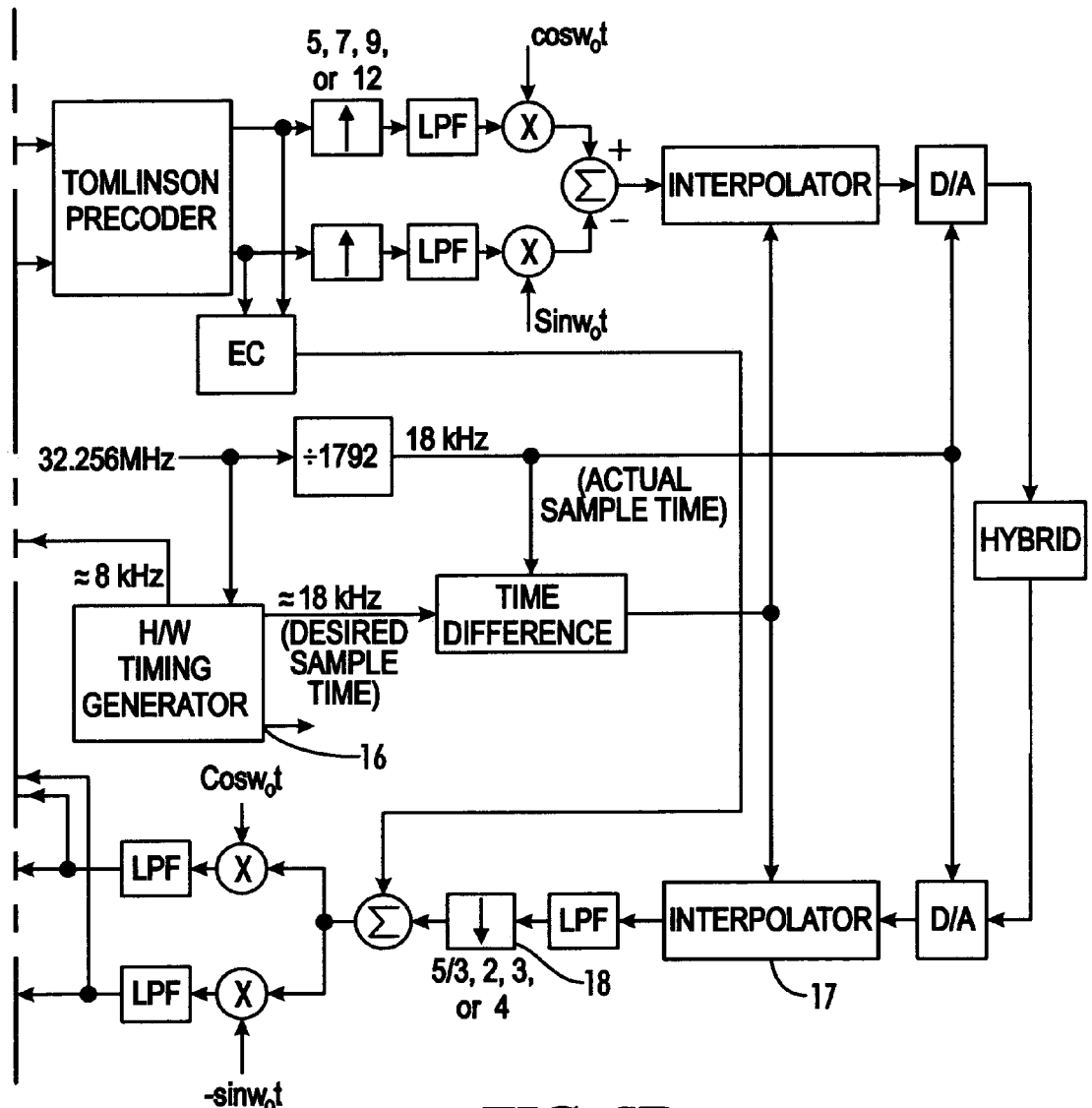

FIG. 5 shows the use of a timing loop according to the present invention in a data transceiver, wherein the upper portion of the diagram shows the transmitter and the lower portion shows the receiver. The transceiver of FIG. 5 can be located at either the remote end or the central office end of the communications loop. In the central office end, the timing is locked to the 8 kHz reference clock. In the remote end, the timing is locked to the received signal, hence indirectly locked to the central office 8 kHz reference clock.

The data input to the transmitter begins with a scrambler, followed by a serial to parallel converter which converts from a serial bit stream into the number of parallel bits required by the trellis encoder. The trellis encoder receives K parallel bits every symbol time and outputs a complex discrete value or voltage. The trellis encoder output passes through a Tomlinson precoder, also producing a complex discrete value (voltage). The Tomlinson precoder is a nonlinear filter that simultaneously pre-equalizes the channel and whitens the output. The Tomlinson precoder output passes through a QAM modulator, providing a real discrete value. In addition, the Tomlinson precoder output passes through the echo canceller to produce the real echo replica. An interpolator receives the output of the modulator and changes the time base from the central office timing to the local 18 kHz timing. The output from the interpolator is then sent through a digital-to-analog converter to the analog hybrid.

The receiver input begins with an A/D converter that produces a real, discrete value, followed by an interpolator to change the time base from the local 18 kHz timing to the central office timing. The interpolator output is supplied to a decimator, which reduces the sample rate to three times the symbol rate, and then the real discrete echo replica is subtracted. After subtracting the echo replica, the signal passes through a QAM demodulator, producing a complex discrete value, followed by a linear equalizer and a modulo device. The resulting complex discrete value is decimated by 3 (reducing the sample rate to the symbol rate) and passed into the trellis decoder. The output of the trellis decoder is K parallel bits that are converted to a serial stream and passed out of the receiver through the descrambler.

The timing loop (13, 14, 15) and the echo canceller are functionally positioned between the transmitter and the receiver. The echo canceller models the echo channel between the output of the Tomlinson precoder and the input to the echo replica subtractor. As described above, the timing loop drives the hardware timing generator 16 to produce a signal which is phase and frequency locked to the central office end, which in turn is used to produce the bit and symbol clocks, and to determine the correct interpolator setting.

The transceiver of FIG. 5 can be operated in a training mode to allow the linear equalizer 20 to correct any signal distortion arising from the communications loop. The linear equalizer coefficients can then be copied to the timing equalizer filter, again as described above.

The timing loop and method of this invention can be used in a dual transceiver intended for use in a dual-duplex, four wire data communications system in which the transceivers operate over two wire pairs (loops), including loops where load coils may be present. However, the application of the timing loop method of this invention is not limited to such systems and devices.

In one implementation of the invention, a digital communications system was configured to run over a 60 kft, 22 AWG loaded communications loop. Using a conventional early-late timing loop without a timing equalizer filter, acquisition of timing from the received signal was difficult and relatively slow. However, by functionally positioning a timing equalizer filter within the timing loop as shown in FIG. 3, the timing acquisition was dramatically improved, greatly reducing the acquisition time. In a preferred embodiment, a compromise timing equalizer filter was designed with filter coefficients corresponding to the equalizer coefficients for a moderate length loop, in the range of 15–30 kft of 24 AWG copper wire. Timing acquisition with shorter loops would be possible without changing this compromise timing equalizer filter.

In another variation of the timing loop of this invention, equalizer coefficients that have been trained for the actual loop under test can be used as the timing equalizer filter coefficients. In this embodiment, the timing loop must first be trained, using a compromise timing equalizer filter, and then the linear equalizer is trained. After training for a certain period of time, the linear equalizer coefficients are copied to the timing equalizer filter.

Thus, although there have been described particular embodiments of the present invention of a new and useful Timing Loop and Method for a Digital Communications System, it is not intended that such references be construed as limitations upon the scope of this invention except as set forth in the following claims.

What is claimed is:

1. In a data communications receiver functionally connected to a communications loop to receive a data signal transmitted across the loop by a transmitter, the receiver having a linear equalizer operable to compensate for distortion in the data signal caused by the communications loop and a timing loop for maintaining signal timing between the transmitter and receiver, the timing loop including a phase detector, an improvement comprising a timing equalizer filter functionally positioned before the phase detector of the timing loop and operating in parallel with and independent of the linear equalizer during a data mode, the timing equalizer filter having fixed coefficients whereby the signal timing controlled by the timing loop can be maintained independently of timing adjustments made in the linear equalizer.

2. The improved data communications receiver of claim 1 wherein the timing equalizer filter includes filter coefficients derived from attaining mode operation of the linear equalizer.

3. The improved data communications receiver of claim 1 wherein the timing equalizer filter includes predetermined filter coefficients based on use with a communications loop of moderate length.

4. The improved data communications receiver of claim 1 wherein the timing loop comprises an early-late timing loop, the phase detector having a signal input functionally linked to an output of the timing equalizer filter, a loop filter functionally coupled to an error signal output of the phase detector, and a voltage controlled oscillator functionally positioned between the loop filter and the timing equalizer filter.

5. An improved method of acquiring and maintaining signal timing between a data communications transmitter and receiver connected at respective central and remote ends of a communications loop, where the receiver includes a timing loop and a linear equalizer operable to compensate for distortion of a received data signal caused by the communications loop, the improvement comprising the steps of:
   a. setting filter coefficients in a timing equalizer filter that is functionally positioned in the timing loop;
   b. passing the received data signal through the timing equalizer filter prior to inputting the received data signal to a phase detector portion of the timing loop; and
   c. operating the timing equalizer filter within the timing loop in a data path separate from the linear equalizer.

6. The method of claim 5 wherein the step of setting the filter coefficients in the timing equalizer filter is performed by copying equalizer coefficients generated in a training mode.

7. The method of claim 5 wherein the step of setting the filter coefficients in the timing equalizer filter is performed by entering filter coefficients into the timing equalizer filter that are based on predetermined compromise equalizer coefficients corresponding to a communications loop having predicted signal distortion characteristics.

8. A method of time locking a receiver to a transmitter in a communications system that sends random digital data signals across a communications loop, where the receiver includes a linear equalizer having adjustable equalizer coefficients and an early-late timing loop adapted to acquire and maintain the time locking, the method comprising functionally positioning a timing equalizer filter in the timing loop and setting filter coefficients in the timing equalizer filter such that operation of the timing loop proceeds independent of the linear equalizer.

9. The method of claim 8 wherein the filter coefficients are set in the timing equalizer filter by copying equalizer coefficients generated during a training mode.

10. An improved method for acquiring timing in a data communications receiver having a received signal and a linear equalizer, the method comprising the steps of:
   a. sampling the received signal to provide a sampled signal;
   b. equalizing the sampled signal with a timing equalizer filter to provide an equalized signal, the timing equalizer filter having fixed coefficients and operating functionally within a timing loop and independent from the linear equalizer;
   c. phase detecting the equalized signal to provide a phase error signal;
   d. filtering the phase error signal with a loop filter thereby providing a control voltage; and
   e. adjusting a voltage controlled oscillator in response to the control voltage whereby the output of the voltage controlled oscillator provides timing for the data communications receiver.

11. An apparatus for acquiring timing in a data communications receiver having a received signal and a linear equalizer, the apparatus comprising:
   a. a timing equalizer filter functionally coupled to the received signal to provide an equalized signal;
   b. a phase detector functionally coupled to the timing equalizer filter and operable to detect a phase difference in the equalized signal and to provide a responsive phase error signal;

c. a loop filter and a voltage-controlled oscillator functionally arranged to generate a timing signal in response to the phase error signal;

d. the timing equalizer filter, phase detector, loop filter and voltage controlled oscillator defining a timing loop path independent from the linear equalizer.

12. A data communications receiver for receiving a stream of user data transmitted from a transmitter across a communications loop comprising:

a. a demodulator adapted to receive and process the user data;

b. a linear equalizer operably coupled to receive and equalize the output from the demodulator;

c. a timing loop operable to generate a timing signal to time lock the receiver to the transmitter using timing information derived from the stream of user data; and d. a timing equalizer filter with fixed coefficients functionally positioned within the timing loop to operate in parallel with and independently of the linear equalizer when in a data mode and to receive and process data from the demodulator to provide an equalized signal to the timing loop.

* * * * *